US010197838B2

(12) United States Patent
Nam et al.

(10) Patent No.: US 10,197,838 B2
(45) Date of Patent: Feb. 5, 2019

(54) TEMPERATURE COMPENSATION POWER CIRCUIT FOR DISPLAY DEVICE

(71) Applicant: SAMSUNG DISPLAY CO., LTD., Yongin-si, Gyeonggi-Do (KR)

(72) Inventors: Yanguk Nam, Hwaseong-si (KR); Daesik Lee, Hwaseong-si (KR); Jongjae Lee, Hwaseong-si (KR); Sujin Kim, Ulsan (KR); Junki Hong, Bucheon-si (KR)

(73) Assignee: SAMSUNG DISPLAY CO., LTD., Yongin-si, Gyeonggi-Do (KR)

( * ) Notice: Subject to any disclaimer, the term of this patent is extended or adjusted under 35 U.S.C. 154(b) by 0 days.

(21) Appl. No.: 15/677,503

(22) Filed: Aug. 15, 2017

(65) Prior Publication Data

US 2018/0059470 A1 Mar. 1, 2018

(30) Foreign Application Priority Data

Aug. 31, 2016 (KR) ........................ 10-2016-0111280

(51) Int. Cl.
*G02F 1/1333* (2006.01)
*G02F 1/1368* (2006.01)
*G09G 3/36* (2006.01)

(52) U.S. Cl.
CPC ...... *G02F 1/133382* (2013.01); *G02F 1/1368* (2013.01); *G09G 3/3677* (2013.01); (Continued)

(58) Field of Classification Search
CPC ........... G09G 2320/041; G09G 3/3648; G09G 2320/0252; G09G 3/3696; G09G 2320/0285; G09G 2320/0673
See application file for complete search history.

(56) References Cited

U.S. PATENT DOCUMENTS 7,791,583 B2 * 9/2010 Lin ...................... G09G 3/3648 345/101
2006/0050038 A1 * 3/2006 Cheon .................. G09G 3/3648 345/89

(Continued)

FOREIGN PATENT DOCUMENTS

| | | |
|---|---|---|
| JP | 3859317 | 9/2006 |
| JP | 4688763 | 2/2011 |
| KR | 1020150071360 | 6/2015 |

*Primary Examiner* — Koosha Sharifi-Tafreshi
(74) *Attorney, Agent, or Firm* — F. Chau & Associates, LLC

(57) ABSTRACT

A display device includes a display panel, a plurality of pixels arranged on the display panel, a data driver and a gate driver configured to apply a driving signal to the plurality of pixels, a timing controller configured to apply a control signal to the data driver and the gate driver, and store a plurality of driving voltage predetermined values for different temperatures, a temperature sensor configured to measure an ambient temperature, and a power management integrated circuit configured to adjust a driving voltage. The power management integrated circuit includes a controller configured to receive a driving voltage predetermined value among the plurality of driving voltage predetermined values from the timing controller using the measured ambient temperature, a plurality of storage banks configured to store the driving voltage predetermined value, and a power generator configured to output the driving voltage at the driving voltage predetermined value.

20 Claims, 12 Drawing Sheets

(52) U.S. Cl.
CPC ......... *G09G 3/3688* (2013.01); *G09G 3/3696* (2013.01); *G09G 2310/0289* (2013.01); *G09G 2310/08* (2013.01); *G09G 2320/0285* (2013.01); *G09G 2320/041* (2013.01)

(56) References Cited

U.S. PATENT DOCUMENTS

2009/0278832 A1* 11/2009 Cho ..................... G09G 3/3648 345/211
2014/0111499 A1* 4/2014 Jang ..................... G09G 3/3696 345/212

* cited by examiner

【FIG 1】
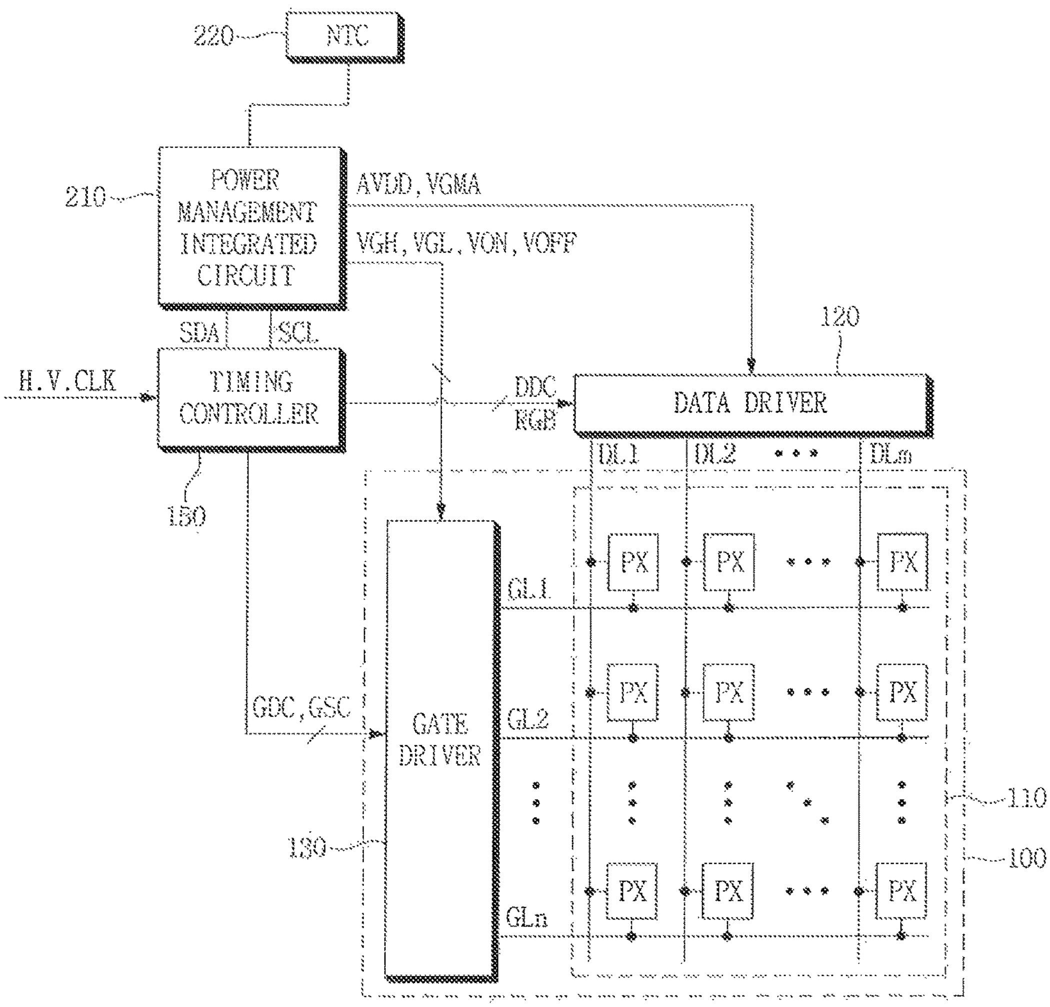

【FIG 2】
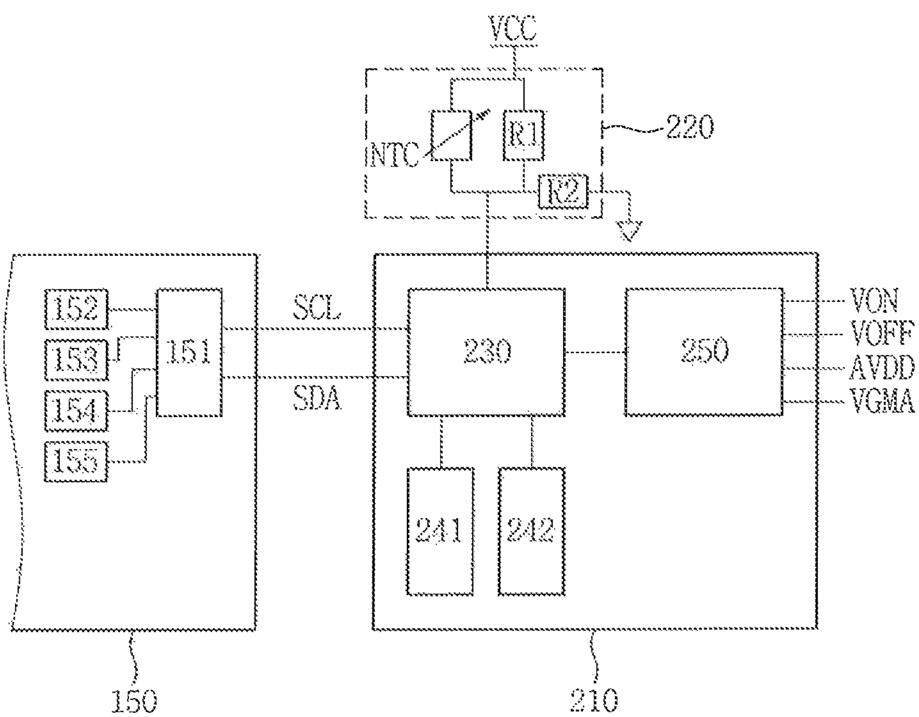

【FIG 3】

| Memory A(-25℃) | |
|---|---|
| AVDD | 17V |
| HAVDD | 8.5V |
| VCOM | 6.5V |
| VGMA | 16.6V |
| ... | ... |
| VON | 31V |
| VOFF | -11.6V |
| VSS | -7.6V |
| Ttr | 900sec |

| Memory B(-0℃) | |
|---|---|
| AVDD | 17V |
| HAVDD | 8.5V |
| VCOM | 6.5V |
| VGMA | 16.6V |
| ... | ... |
| VON | 27V |
| VOFF | -11.6V |
| VSS | -7.6V |
| Ttr | 700sec |

| Memory C(+25℃) | |
|---|---|
| AVDD | 17V |
| HAVDD | 8.5V |
| VCOM | 6.5V |
| VGMA | 16.6V |
| ... | ... |
| VON | 22V |
| VOFF | -11.6V |
| VSS | -7.6V |
| Ttr | 700sec |

| Memory D(60℃) | |
|---|---|
| AVDD | 17V |
| HAVDD | 8.5V |
| VCOM | 6.5V |
| VGMA | 16.6V |
| ... | ... |
| VON | 15V |
| VOFF | -11.6V |
| VSS | -7.6V |
| Ttr | 15sec |

【FIG 4A】
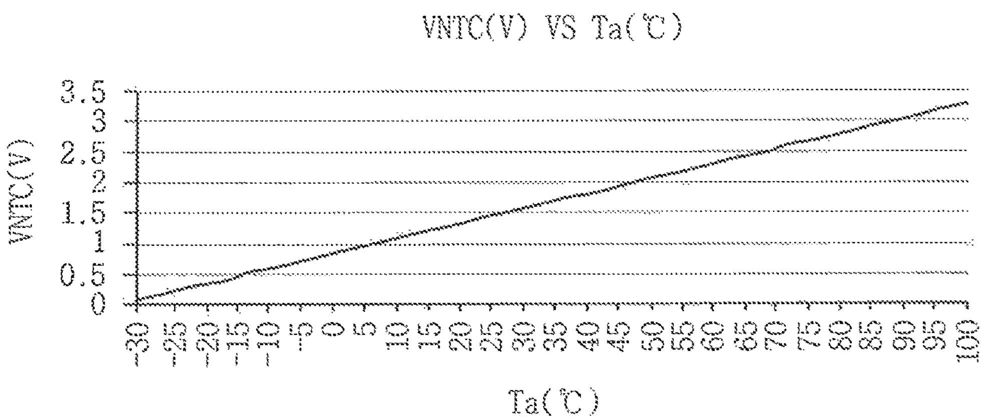

【FIG 4B】
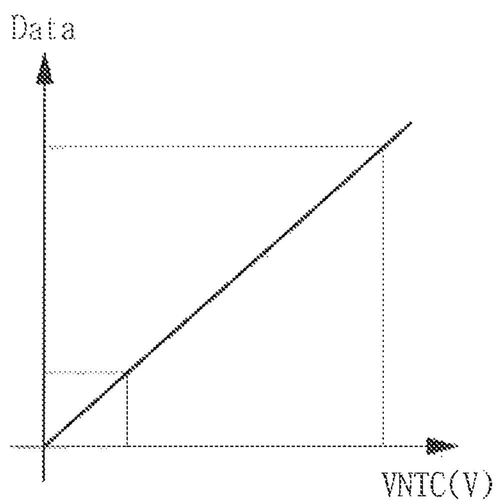

【FIG 4C】

| TEMP | VNTC | DATA |
|---|---|---|
| -27℃ | 0.172V | 0000000 |
| -26℃ | 0.196V | 0000001 |
| -25℃ | 0.221V | 0000010 |
| -24℃ | 0.245V | 0000011 |
| ... | ... | ... |
| 98℃ | 3.201V | 1111101 |
| 99℃ | 3.224V | 1111110 |
| 100℃ | 3.248V | 1111111 |

【FIG 5】
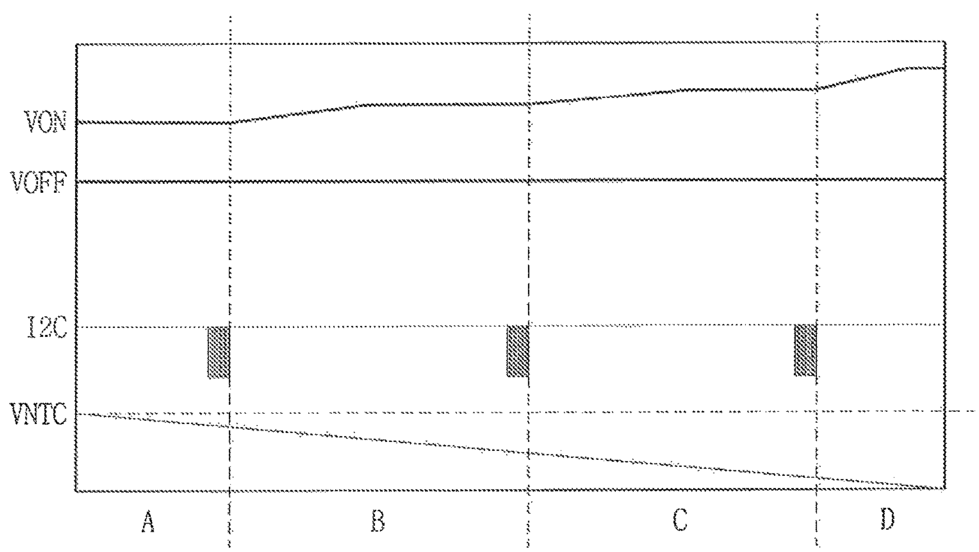

【FIG 6】
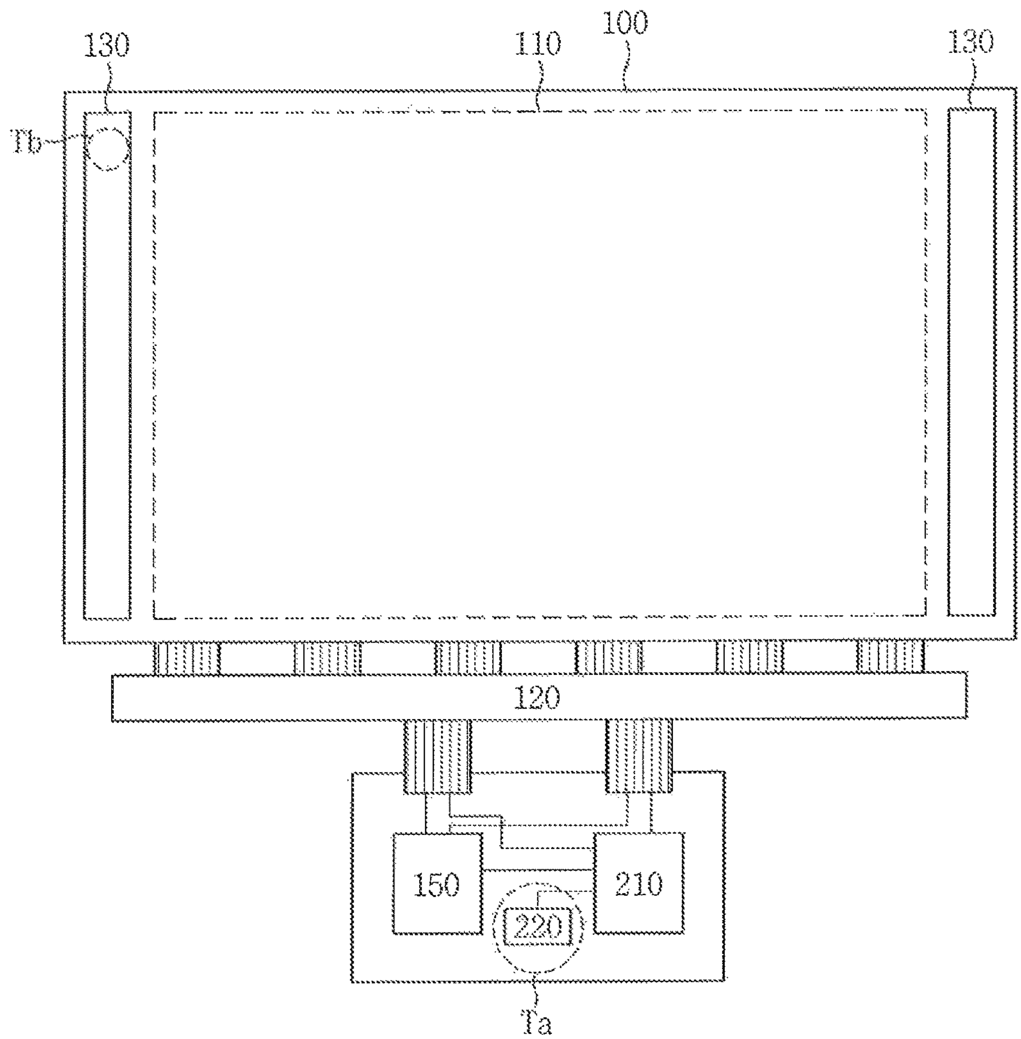

【FIG 7A】
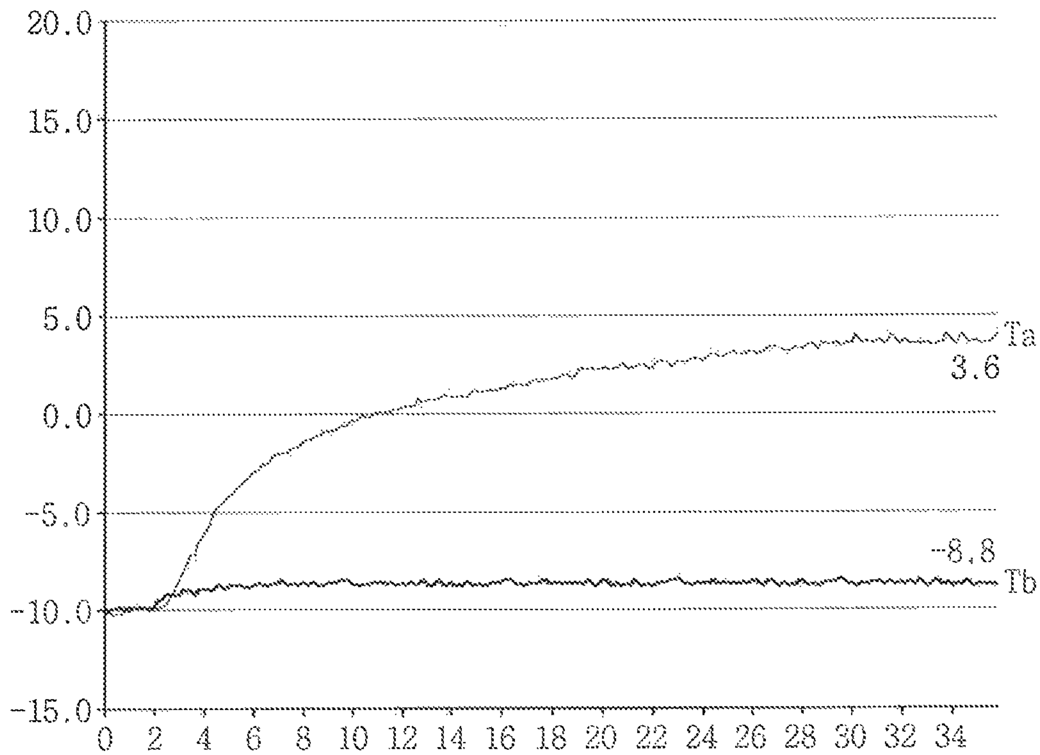

【FIG 7B】
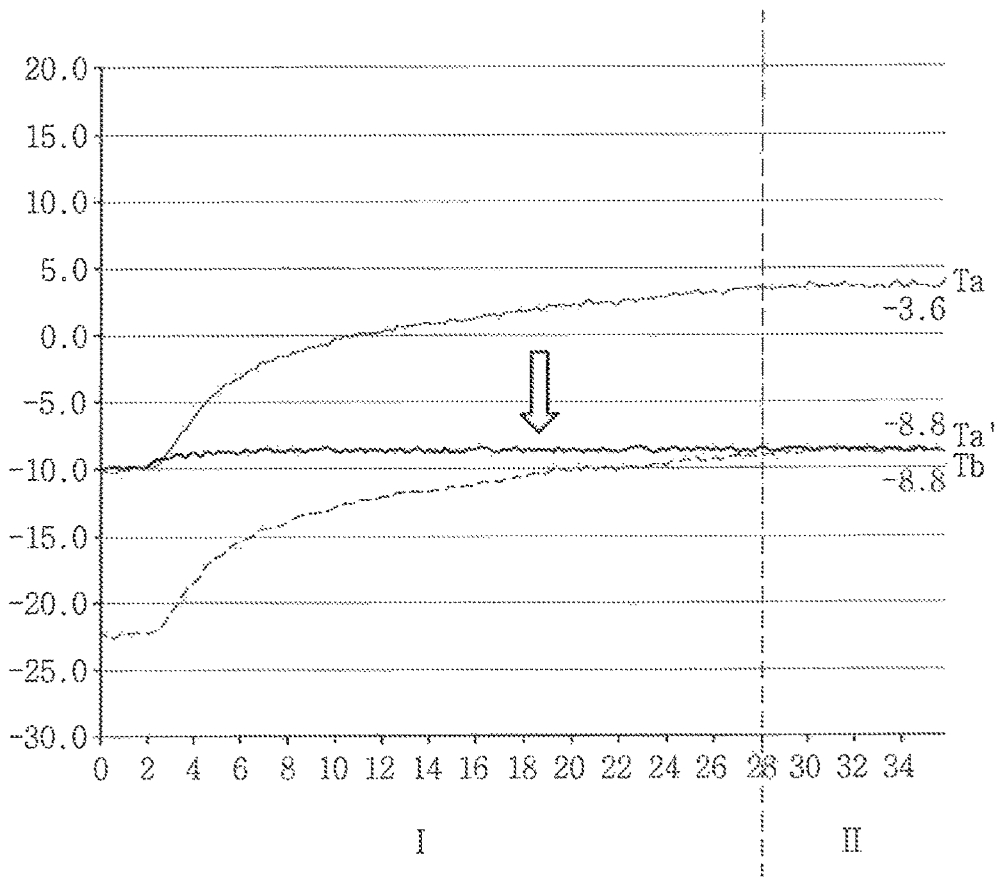

【FIG 8】
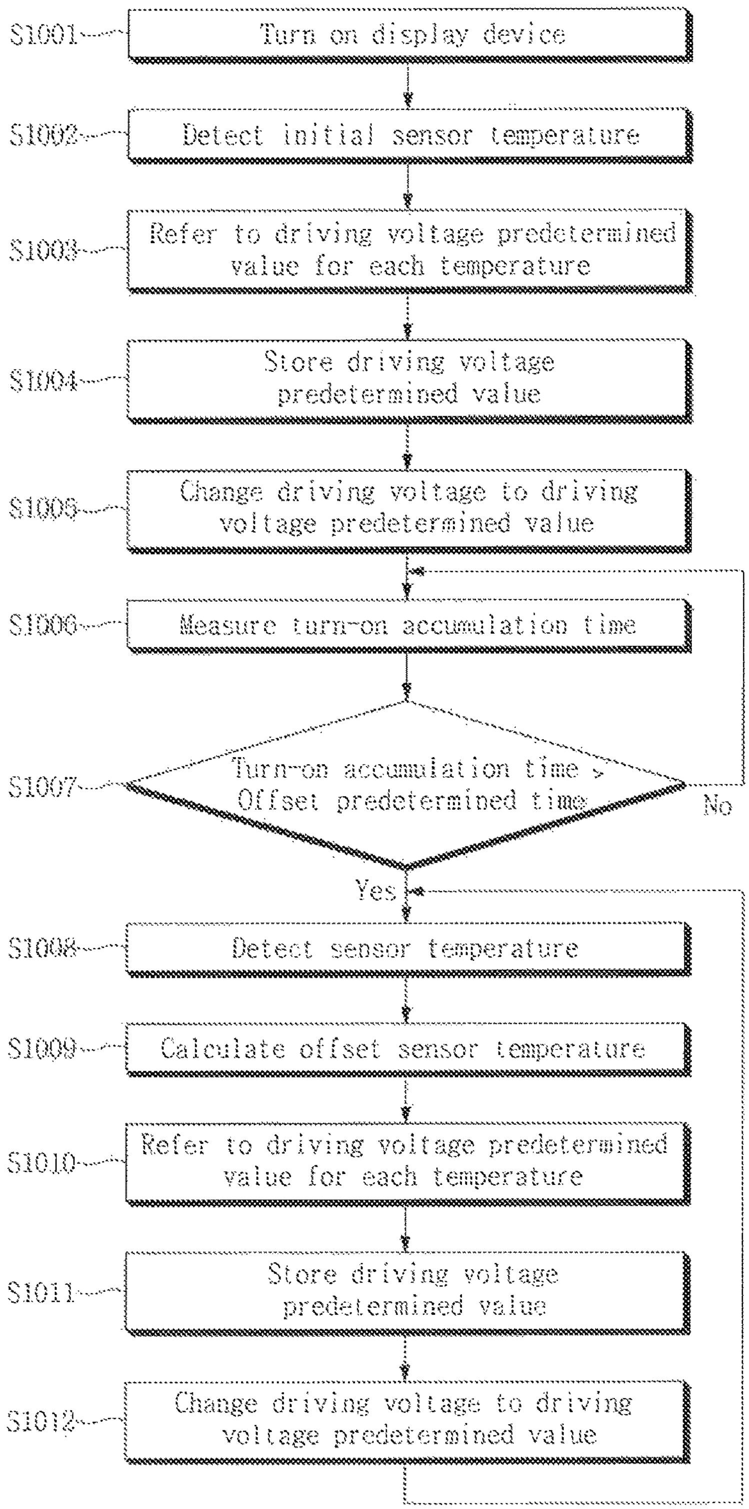

【FIG 9】
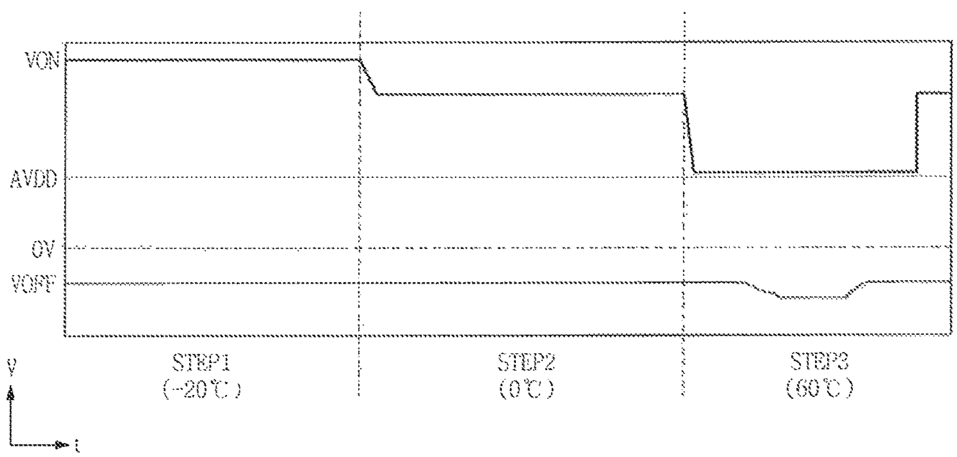

TEMPERATURE COMPENSATION POWER CIRCUIT FOR DISPLAY DEVICE

CROSS-REFERENCE TO RELATED APPLICATION

This application claims priority under 35 U.S.C. § 119 to Korean Patent Application No. 10-2016-0111280, filed on Aug. 31, 2016 in the Korean Intellectual Property Office (KIPO), the disclosure of which is incorporated by reference herein in its entirety.

TECHNICAL FIELD

Exemplary embodiments of the inventive concept relate to a display device including a power device that changes an output voltage depending on the temperature.

DISCUSSION OF RELATED ART

Display devices display an image with an element that emits light. Recently, flat panel display devices have been widely used as display devices. Flat panel display devices may be classified into liquid crystal display (LCD) devices, organic light emitting diode (OLED) display devices, plasma display panel (PDP) devices, electrophoretic display devices, or the like based on a light emitting scheme thereof.

Display devices generally include a gate driver driving gate lines, a data driver driving data lines, a timing controller controlling the gate driver and the data driver, and a power management integrated circuit (PMIC) that generates a driving voltage and a gamma voltage.

The driving voltage and the gamma voltage are output from the PMIC and applied to the data driver through a connection unit. In such an example, a driving voltage and a gamma voltage of an appropriate level are set in the PMIC in consideration of various conditions such as the size of the display panel used in the display device and the operating temperature.

For example, in the case of a display panel including a gate driver formed on a substrate, an operating voltage of a gate driving transistor may be shifted depending on the operating temperature. To optimize the operation state of the gate driver, the PMIC may detect the operating temperature of the surrounding area and may adjust the driving voltage and the gamma voltage in accordance with the detected operating temperature.

SUMMARY

According to an exemplary embodiment of the inventive concept, a display device includes a display panel, a plurality of pixels arranged on the display panel, a data driver and a gate driver configured to apply a driving signal to the plurality of pixels, a timing controller configured to apply a control signal to the data driver and the gate driver, and store a plurality of driving voltage predetermined values for different temperatures, a temperature sensor configured to measure an ambient temperature, and a power management integrated circuit configured to adjust a driving voltage. The power management integrated circuit includes a controller configured to receive a driving voltage predetermined value among the plurality of driving voltage predetermined values from the timing controller using the measured ambient temperature, a plurality of storage banks configured to store the driving voltage predetermined value, and a power generator configured to output the driving voltage at the driving voltage predetermined value.

The temperature sensor may include a thermistor and is electrically connected to the power management integrated circuit.

One of the plurality of storage banks of the power management integrated circuit may store a previous driving voltage predetermined value and another of the plurality of storage banks may store a newly received driving voltage predetermined value from the timing controller.

The timing controller may include a plurality of lookup tables configured to store the plurality of driving voltage predetermined values and a plurality of driving voltage change time values. The power management integrated circuit may receive a driving voltage change time value, among the plurality of driving voltage change time values, corresponding to the driving voltage predetermined value from the timing controller and store the received driving voltage change time value in one of the plurality of storage banks.

The power management integrated circuit may change the driving voltage from a previous driving voltage corresponding to the previous driving voltage predetermined value to a new driving voltage corresponding to the driving voltage predetermined value, according to the driving voltage change time value.

The plurality of driving voltage change time values stored in the plurality of lookup tables may have different values depending on a temperature.

The plurality of driving voltage change time values may decrease as temperature increases.

The controller may receive a first driving voltage predetermined value from the timing controller using an initial temperature measured by the temperature sensor after the display device is turned on and may not change the first driving voltage predetermined value for a predetermined time.

According to an exemplary embodiment of the inventive concept, a method of managing power of a display device includes outputting a first sensor temperature by detecting an ambient temperature, referring to a first driving voltage predetermined value stored in a timing controller using the first sensor temperature, storing the referred first driving voltage predetermined value in a storage bank of a power management integrated circuit, and changing a driving voltage according to the stored first driving voltage predetermined value.

The method may further include calculating a turn-on accumulation time of the display device. The first sensor temperature may be an initial sensor temperature immediately after the display device is turned on.

The method may further include comparing the turn-on accumulation time with an offset predetermined time. The offset predetermined time may be obtained based on a state of sensor temperature rise saturation.

When the turn-on accumulation time is less than or equal to the offset predetermined time, the first driving voltage predetermined value may be maintained.

The method may further include outputting a second sensor temperature by detecting the ambient temperature when the turn-on accumulation time is greater than the offset predetermined time, generating an offset sensor temperature by adding an offset temperature to the second sensor temperature, and referring to a second driving voltage predetermined value stored in the timing controller using the offset sensor temperature.

The referred first driving voltage predetermined value is stored in an inactive storage bank of the power management integrated circuit. The method may further include switching the inactive storage bank to an active storage bank and generating a notification event.

The driving voltage is changed to the stored first driving voltage predetermined value of the active storage bank according to the notification event.

According to an exemplary embodiment of the inventive concept, a display device includes a display panel, a plurality of pixels arranged on the display panel, a data driver and a gate driver configured to apply a driving signal to the plurality of pixels, a timing controller configured to provide a first driving voltage predetermined value, among a plurality of driving voltage predetermined values stored therein, and apply a control signal to the data driver and the gate driver, a temperature sensor configured to measure an ambient temperature, and a power management integrated circuit configured to receive the first driving voltage predetermined value from the timing controller using the measured ambient temperature and adjust a driving voltage using the first driving voltage predetermined value. The timing controller includes a plurality of lookup tables configured to store the plurality of driving voltage predetermined values and a plurality of driving voltage change time values according to different temperatures.

The plurality of driving voltage predetermined values may include at least one of analog driving voltages, common voltages, gamma voltages, gate on voltages, or gate off voltages, according to different temperatures.

The temperature sensor may include a thermistor connected between a power source and a first node, a first resistor connected between the power source and the first node, and a second resistor connected between the first node and ground.

A first driving voltage change time value, among the plurality of driving voltage change time values, may correspond to the first driving voltage predetermined value. The power management integrated circuit may adjust the driving voltage over a period of time corresponding to the first driving voltage change time value to target the first driving voltage predetermined value.

When the ambient temperature is less than a predetermined threshold, the power management integrated circuit may adjust a gate on voltage and maintain a gate off voltage to target the first driving voltage predetermined value. When the ambient temperature is greater than or equal to the predetermined threshold, the power management integrated circuit may adjust both the gate on voltage and the gate off voltage to target the first driving voltage predetermined value.

BRIEF DESCRIPTION OF THE DRAWINGS

The above and other features of the inventive concept will become more apparent by describing in detail exemplary embodiments thereof with reference to the accompanying drawings.

FIG. 1 is a configuration view illustrating a display device according to an exemplary embodiment of the inventive concept.

FIG. 2 is a configuration view illustrating a power management integrated circuit (PMIC) of FIG. 1 according to an exemplary embodiment of the inventive concept.

FIG. 3 illustrates a temperature-voltage lookup table including a driving voltage predetermined value according to temperature according to an exemplary embodiment of the inventive concept.

FIG. 4A is a graph illustrating a sensing voltage that depends on temperature change according to an exemplary embodiment of the inventive concept.

FIG. 4B is a graph binarizing a voltage value of a temperature sensing voltage according to an exemplary embodiment of the inventive concept.

FIG. 4C is a table showing binarized codes corresponding to temperature according to an exemplary embodiment of the inventive concept.

FIG. 5 is a graph illustrating an output voltage depending on a change in a sensor temperature according to an exemplary embodiment of the inventive concept.

FIG. 6 is a configuration view illustrating a temperature sensor of FIG. 1 according to an exemplary embodiment of the inventive concept.

FIG. 7A is a graph illustrating a sensor temperature and a panel temperature of a display panel of FIG. 6 over time, according to an exemplary embodiment of the inventive concept.

FIG. 7B is a graph illustrating the sensor temperature of FIG. 7A applied with an offset according to an exemplary embodiment of the inventive concept.

FIG. 8 is a voltage setting flowchart of a display device according to an exemplary embodiment of the inventive concept.

FIG. 9 is a waveform diagram illustrating a driving power of a display device according to an exemplary embodiment of the inventive concept.

DETAILED DESCRIPTION OF THE EMBODIMENTS

Exemplary embodiments of the inventive concept are directed to a display device including a power management integrated circuit capable of outputting an optimal driving voltage to compensate for a threshold voltage variation of a thin film transistor in a driving unit that may occur due to temperature change during use of the display device.

Exemplary embodiments will now be described more fully hereinafter with reference to the accompanying drawings. Like reference numerals may refer to like elements throughout this application.

Throughout the specification, when an element is referred to as being "connected" to another element, the element is "directly connected" to the other element or "electrically connected" to the other element with one or more intervening elements interposed therebetween. It will be further understood that the terms "comprises," "comprising," "includes," and/or "including," when used in this specification, specify the presence of stated features, integers, steps, operations, elements, and/or components, but do not preclude the presence or addition of one or more other features, integers, steps, operations, elements, components, and/or groups thereof.

It will be understood that, although the terms "first," "second," "third," and the like may be used herein to describe various elements, these elements should not be limited by these terms. These terms are only used to distinguish one element from another element. Thus, "a first element" discussed below could be termed "a second element" or "a third element," and "a second element" and "a third element" may be termed likewise without departing from the teachings herein.

"About" or "approximately" as used herein is inclusive of the stated value and values within an acceptable range of deviation from the stated value as determined by one of ordinary skill in the art, considering the measurement in question and the error associated with measurement of the particular quantity (e.g., the limitations of the measurement system). For example, "about" may be within one or more standard deviations, or within ±30%, 20%, 10%, or 5% of the stated value.

FIG. 1 is a configuration view illustrating a display device according to an exemplary embodiment of the inventive concept.

As illustrated in FIG. 1, the display device according to an exemplary embodiment of the inventive concept includes a display panel 100, a pixel area 110, a data driver 120, a gate driver 130, a timing controller (T-CON) 150, and a power management integrated circuit (PMIC) 210.

In the case where the display panel 100 is a liquid crystal display (LCD) panel, an LCD device including the display panel 100 may further include a backlight unit providing light to the display panel 100 and a pair of polarizers. In addition, the LCD panel may be in one of a vertical alignment (VA) mode, a patterned vertical alignment (PVA) mode, an in-plane switching (IPS) mode, a fringe-field switching (FFS) mode, or a plane to line switching (PLS) mode, but is not limited to panels of a particular mode.

The display panel 100 includes a plurality of gate lines GL1 to GLn, a plurality of data lines DL1 to DLm crossing and insulated from, by a dielectric layer, the plurality of gate lines GL1 to GLn, and a plurality of pixels PX electrically connected to the plurality of gate lines GL1 to GLn and the plurality of data lines DL1 to DLm. The plurality of gate lines GL1 to GLn are connected to the gate driver 130 and the plurality of data lines DL1 to DLm are connected to the data driver 120.

The data driver 120 includes a plurality of data driving integrated circuits (ICs). The data driving ICs may include thin film transistors (TFTs) and may be mounted directly on the display panel 100. The data driver 120 receives digital image data signals RGB and a data driving control signal DDC from the T-CON 150. The data driver 120 samples the digital image data signals RGB according to the data driving control signal DDC, latches the sampling image data signals corresponding to one horizontal line in each horizontal period, and applies the latched image data signals to the data lines DL1 to DLm.

The gate driver 130 receives a gate-on voltage VON, a gate-off voltage VOFF, and gate driving voltages VGH and VGL from the PMIC 210, and receives a gate driving control signal GDC and a gate shift clock GSC from the T-CON 150. The gate driver 130 sequentially generates gate pulse signals in response to the gate driving control signal GDC and the gate shift clock GSC, and applies the gate pulse signals to the gate lines GL1 to GLn.

The T-CON 150 applies the digital image data signals RGB externally applied thereto to the data driver 120. The T-CON 150 generates the data driving control signal DDC and the gate driving control signal GDC according to a clock signal CLK, using a horizontal synchronization signal H and a vertical synchronization signal V, and applies the data driving control signal DDC to the data driver 120 and the gate driving control signal GDC to the gate driver 130. In the present exemplary embodiment, the data driving control signal DDC may include a source shift clock, a source start pulse, a data output enable signal, or the like, and the gate driving control signal GDC may include a gate start pulse, a gate output enable signal, or the like.

The PMIC 210 applies, to the data driver 120, an analog driving voltage AVDD and a gamma voltage VGMA, which are reference voltages for converting an image signal. The data driver 120 receives the analog driving voltage AVDD and the gamma voltage VGMA input from the PMIC 210. The data driver 120 receives the digital image data signals RGB from the T-CON 150 to convert the digital image data signals RGB into analog image data signals and apply the analog image data signals to the data lines DL1 to DLm. The PMIC 210 may be connected to the T-CON 150 via a serial clock (SCL) signal line and a serial data (SDA) signal line. The PMIC 210 may be connected to a temperature sensor 220 to detect an ambient temperature.

The temperature sensor 220 is a circuit block including a thermistor NTC and a resistor. For example, the temperature sensor 220 is a voltage dividing circuit including a resistance element including a thermistor NTC of which a resistance value varies according to the ambient temperature and is configured such that a voltage of an output terminal thereof is changed according to temperature. The temperature sensor 220 is connected to the PMIC 210 and may be disposed at a peripheral portion of a circuit element driving the display panel 100. The circuit element performs an operation of converting and processing signals for a screen display operation of the display panel 100, and a part of consumed power is generated as heat.

The PMIC 210 detects a voltage of the output terminal of the temperature sensor 220 connected thereto, converts it to a sensor temperature, and may change a driving voltage output to the data driver 120 and the gate driver 130 based on the sensor temperature.

FIG. 2 is a configuration view illustrating a PMIC of FIG. 1 according to an exemplary embodiment of the inventive concept.

Referring to FIG. 2, the PMIC 210 includes a controller 230, a first storage bank 241, a second storage bank 242, and a power generator 250.

The controller 230 is connected to the T-CON 150 through an inter-integrated circuit (I2C) interface. The I2C interface is a signal transmission interface that transmits and receives data through the SCL signal line and the SDA signal line. The I2C interface is a serial communication interface that synchronizes clocks over the SCL signal line and performs data input and output through the SDA signal line. Simultaneous two-way communication is impossible because the I2C interface performs transmission and reception with only one line. Transmission speed is available from about 100 kHz to about 400 kHz.

The T-CON 150 includes a plurality of memory blocks 152, 153, 154, and 155 connected to an I2C interface communication unit 151. Each of the memory blocks 152, 153, 154, and 155 stores a lookup table including a driving voltage predetermined value according to the temperature. The driving voltage predetermined value may set an output voltage of a power output from the PMIC 210. It is possible to compensate for a malfunction of the display device due to temperature change by setting the temperature-dependent driving voltage predetermined values stored in the lookup tables.

The controller 230 reads the driving voltage predetermined value from the lookup tables of the T-CON 150 and stores the driving voltage predetermined value in one of the first storage bank 241 and the second storage bank 242 that is designated as an inactive storage bank. On the other hand, an active storage bank refers to a storage bank storing a previous driving voltage predetermined value corresponding to a driving voltage output from the power generator 250.

The other storage banks, excluding the active storage bank, are designated as inactive storage banks.

For example, in the circuit configuration of FIG. 2, in the case where the power generator 250 is outputting a voltage at the previous driving power predetermined value stored in the first storage bank 241, the first storage bank 241 corresponds to the active storage bank. In the present exemplary embodiment, a new driving voltage predetermined value received by the controller 230 is stored in the second storage bank 242 which is an inactive storage bank. The controller 230 generates a notification event when the storage of the driving power predetermined value is completed in the second storage bank 242. Accordingly, the controller 230 designates the second storage bank 242 as the active storage bank and the first storage bank 241 as the inactive storage bank.

The notification event generated by the controller 230 is transmitted to the power generator 250 and the power generator 250 reads the new driving power predetermined value stored in the second storage bank 242 to change the driving voltage.

The power generator 250 generates the driving voltage at the driving voltage predetermined value stored in the storage bank (e.g., the second storage bank 242). The power generator 250 may generate the gate-on voltage VON, the gate-off voltage VOFF, the analog driving voltage AVDD, the gamma voltage VGMA, a common voltage Vcom, gate driving voltages VGH and VGL, and the like, and output them to be applied to the display panel.

The driving voltage predetermined value may further include a driving voltage change time value. The driving voltage change time value sets a time during which the driving voltage of the power generator 250 gradually changes from a driving voltage corresponding to the previous driving voltage predetermined value to a driving voltage corresponding to the new driving voltage predetermined value received due to the temperature change.

In the case where the driving voltage of the power generator 250 changes rapidly over a relatively short period of time, a problem may arise where a brightness of the screen of the display panel 100 changes rapidly. The power generator 250 may control the driving voltage to change more gently or slowly according to the driving voltage change time value. The driving voltage change time value stored in the lookup table may have different predetermined values depending on the ambient temperature. For example, in the case where the ambient temperature is relatively low, it is desirable that the change of the driving voltage occur gently over a long period of time to compensate for the temperature characteristic of the thin film transistor of the driving control unit. On the other hand, in the case where the ambient temperature is relatively high, high temperature noise of the thin film transistor may occur, thus degrading the display quality, and accordingly, it is more advantageous to set the driving voltage change time value to be short so as to increase the display quality. In other words, the driving voltage change time may be set to be shorter in the case of a high ambient temperature than in the case of a low ambient temperature.

FIG. 3 illustrates a temperature-voltage lookup table including a driving voltage setting value according to temperature, according to an exemplary embodiment of the inventive concept.

Referring to FIG. 3, the T-CON 150 includes at least two temperature-voltage lookup tables (T-V lookup tables).

A memory A shows driving voltage predetermined values of the analog driving voltage AVDD, a half analog driving voltage HAVDD, the common voltage Vcom, the gamma voltage VGMA, the gate-on voltage VON, the gate-off voltage VOFF, and a TFT off voltage VSS when a sensor temperature is about −25° C.

A memory B shows driving voltage predetermined values of the analog driving voltage AVDD, the half analog driving voltage HAVDD, the common voltage Vcom, the gamma voltage VGMA, the gate-on voltage VON, the gate-off voltage VOFF, and the TFT off voltage VSS when a sensor temperature is about 0° C.

A memory C shows driving voltage predetermined values of the analog driving voltage AVDD, the half analog driving voltage HAVDD, the common voltage Vcom, the gamma voltage VGMA, the gate-on voltage VON, the gate-off voltage VOFF, and the TFT off voltage VSS when a sensor temperature is about 25° C.

A memory D shows driving voltage predetermined values of the analog driving voltage AVDD, the half analog driving voltage HAVDD, the common voltage Vcom, the gamma voltage VGMA, the gate-on voltage VON, the gate-off voltage VOFF, and the TFT off voltage VSS when a sensor temperature is about 60° C.

FIG. 3 illustrates driving voltage predetermined values for −25° C., 0° C., 25° C., and 60° C., for convenience of explanation. However, it is possible to set the voltage according to various temperature conditions in consideration of the characteristics of the display device and the usage environment, and the temperature setting condition may be finely set down to units of 1° C. In addition, although only the gate-on voltage VON among the driving voltages is changed from 31 V to 15 V by way of example, it is also possible to vary the gate-off voltage VOFF and the common voltage VCOM according to the structure of the display panel and the temperature characteristic thereof.

In addition, as described above, the driving voltage predetermined value includes the driving voltage and a driving voltage change time value Ttr. The driving voltage change time value Ttr is set so as to substantially prevent the driving voltage from abruptly changing in accordance with the driving voltage predetermined value to compensate for the temperature change.

FIG. 4A is a graph illustrating a sensing voltage that depends on temperature change according to an exemplary embodiment of the inventive concept. FIG. 4B is a graph binarizing a voltage value of a temperature sensing voltage according to an exemplary embodiment of the inventive concept. FIG. 4C is a table showing binarized codes corresponding to temperature according to an exemplary embodiment of the inventive concept.

FIG. 4A shows a correlation between a temperature sensing voltage VNTC and a sensor temperature Ta of the temperature sensor 220 of FIG. 2. Referring back to FIG. 2, the thermistor NTC is an element of which resistance value varies in accordance with a change in temperature. The temperature sensor 220 includes a first resistor R1 connected in parallel with the thermistor NTC and a second resistor R2 connected in series with the thermistor NTC. One end of the first resistor R1 is connected to a power source VCC and one end of the second resistor R2 is connected to the ground potential. When the sensor temperature Ta rises, the resistance value of the thermistor NTC decreases proportionally. When the resistance value of the thermistor NTC decreases, the temperature sensing voltage VNTC of a connection node between the first resistor R1 and the second resistor R2 increases. As shown in FIG. 4A, as the temperature sensing voltage VNTC increases, the sensor temperature Ta rises proportionally. The sensor temperature Ta in an area where the temperature sensor 220 is located may be detected by measuring the temperature sensing voltage VNTC.

Referring to FIGS. 4B and 4C, for the temperature from −27° C. to 100° C., the temperature sensing voltage VNTC and the corresponding data may be allocated in units of 1° C. The data consists of 8 bits of binary code and may be assigned to the temperature ranging from −27° C. to 100° C. However, the inventive concept is not limited thereto. Depending on the accuracy of the temperature control, the data configuration may be changed.

FIG. 5 is a graph illustrating an output voltage depending on a change in a sensor temperature according to an exemplary embodiment of the inventive concept.

Referring to FIG. 5, an operation section is divided into four sections A, B, C, and D according to the sensor temperature.

The measured temperature sensing voltage VNTC is continuously lowered over the entire operation section. It may be identified from the temperature sensing voltage VNTC that the ambient temperature is falling from a high temperature to a low temperature.

In section A, in the case where the temperature sensing voltage VNTC continuously falls to be out of a predetermined temperature range, the PMIC 210 refers to a driving voltage predetermined value, corresponding to a measured temperature of the temperature sensing voltage VNTC, received from the T-CON 150 through the I2C interface. The T-CON 150 transmits, to the PMIC 210 via the I2C interface, the corresponding driving voltage predetermined value from a temperature-voltage lookup table stored in a memory. The PMIC 210 stores the received driving voltage predetermined value in the first storage bank 241 or second storage bank 242.

In section B, the PMIC 210 may continuously change the driving voltages of the gate-on voltage VON and the gate-off voltage VOFF for a period of time corresponding to the driving voltage change time value (e.g., Ttr), targeting the received driving voltage predetermined value. The graph illustrated in FIG. 5 indicates that the gate-on voltage VON rises and the gate-off voltage VOFF is fixed. The PMIC 210 allows the driving voltage to gradually change with a time value ranging from several seconds to several tens of minutes in accordance with the driving voltage change time value, and thus, may substantially prevent degradation of luminance and display quality that may occur due to an abrupt change in the driving voltage. When the driving voltage of the PMIC 210 reaches the new driving voltage predetermined value, the PMIC 210 stops the rising of the driving voltage and maintains the driving voltage. In section B, measurement of the temperature sensing voltage VNTC continues, and when the temperature sensing voltage VNTC is out of the predetermined range set for section B, the PMIC 210 makes a request to the T-CON 150 for a driving voltage predetermined value corresponding to the detected temperature and receives it.

Descriptions of operations during sections C and D are substantially the same as those of sections A and B, and thus will be omitted.

FIG. 6 is a configuration view illustrating a temperature sensor of FIG. 1 according to an exemplary embodiment of the inventive concept.

Referring to FIG. 6, the temperature sensor 220 is connected to the PMIC 210 and is disposed outside the PMIC 210. The temperature sensor 220 detects the sensor temperature Ta corresponding to the ambient temperature of the position in which it is disposed.

The display panel 100 includes the pixel area 110 and a non-display area in which the gate driver 130 is mounted. The gate driver 130 includes the thin film transistor and may generate heat according to an image display operation. A panel temperature Tb refers to a temperature of a gate driver mounting area of the display panel 100.

The sensor temperature Ta refers to a temperature of an area adjacent to the T-CON 150 or the PMIC 210 and may become high due to elements generating a large amount of heat, e.g., a computing device.

On the other hand, the panel temperature Tb is a temperature corresponding to the non-display area of the display panel 100 and is affected by heat generated by the operation of the gate driver 130. Since the gate driver 130 does not generate much heat due to its operating characteristics, the panel temperature Tb better reflects the ambient temperature than the heat generated by the gate driver 130.

Thus, the PMIC 210 may indirectly determine the panel temperature Tb around the gate driver 130 through the temperature sensor 220 connected thereto.

FIG. 7A is a graph illustrating a sensor temperature and a panel temperature of a display panel of FIG. 6 over time, according to an exemplary embodiment of the inventive concept.

FIG. 7B is a graph illustrating the sensor temperature of FIG. 7A applied with an offset according to an exemplary embodiment of the inventive concept.

Referring to FIG. 7A, the sensor temperature Ta and the panel temperature Tb initially show −10° C. This means that the ambient temperature of the display device is about −10° C. After the display device is turned on, the sensor temperature Ta rises continuously until about 30 minutes have elapsed. After about 30 minutes have elapsed, the sensor temperature Ta does not rise further and remains at about 3.6° C. In other words, the sensor temperature Ta is continuously affected by the heat of the surrounding circuit elements and continuously increases for a certain period of time after the operation.

On the other hand, the panel temperature Tb rises by about 1.2° C. immediately after the display device is turned on, and then maintains a temperature of −8.8° C. The panel temperature Tb is influenced only by the sensor temperature of the gate driver 130, without being affected by the heat generation of the elements, as it is measured sufficiently apart from the heat generating elements.

FIG. 7B is a graph obtained by adding an offset temperature to the sensor temperature Ta. The PMIC 210 calculates an offset sensor temperature Ta' by adding a certain offset temperature to the sensor temperature Ta. The offset temperature is a value corresponding to a temperature difference between the sensor temperature Ta and the panel temperature Tb based on a point in time at which the rising of the sensor temperature Ta stops in the graph of FIG. 7A. The offset temperature may be calculated by detecting the sensing temperature Ta in real time in the PMIC 210 and identifying a temperature rise saturation. Alternatively, the offset temperature may be determined as a value measured and set during the designing or manufacturing process of the display device.

In FIG. 7B, section I corresponds to a section before a time point when the rise of the sensor temperature Ta stops in the graph of FIG. 7A. In section I, the offset sensor temperature Ta' shows a large temperature difference with respect to the panel temperature Tb. The sensor temperature Ta or the offset sensor temperature Ta' that may be referred to by the PMIC 210 does not have a temperature value equal to the panel temperature Tb. Accordingly, in section I, the PMIC 210 refers to the driving voltage predetermined value using the sensor temperature Ta immediately after the turn-on, and does not refer to the driving voltage predetermined value or change the driving voltage based on the sensor temperature Ta or the offset sensor temperature Ta'.

In FIG. 7B, section II corresponds to a section after the time point when the rise of the sensor temperature Ta stops in the graph of FIG. 7A. In section II, the offset sensor temperature Ta' has a temperature value substantially equal to the panel temperature Tb. In section II, the PMIC 210 refers to the driving voltage predetermined value and changes the driving voltage based on the offset sensor temperature Ta'.

A length of section I depends on the design conditions and structure of the display panel and may be set in advance during the product designing and production processes.

FIG. 8 is a voltage setting flowchart of a display device according to an exemplary embodiment of the inventive concept.

When the display device is initially turned on (S1001), the PMIC 210 detects a sensor temperature reflecting an initial ambient temperature of the display device from the temperature sensor 220 (S1002).

The PMIC 210 refers to the driving voltage predetermined value stored in the T-CON 150 based on the detected sensor temperature (S1003). The driving voltage predetermined values for different temperatures are stored in a lookup table structure, and the PMIC 210 and the T-CON 150 communicate with each other via the I2C interface in two-way directions.

The controller 230 of the PMIC 210 stores the received driving voltage predetermined value in the inactive storage bank (S1004). As described above, the active storage bank refers to a storage bank storing a previous driving voltage predetermined value corresponding to a driving voltage output from the power generator 250. Only one storage bank may be designated as the active storage bank among the storage banks. The other storage banks are designated as inactive storage banks. Once the storage of the driving voltage predetermined value is completed, the inactive storage bank storing the driving voltage predetermined value is changed into the active storage bank, and the existing active storage bank is changed into an inactive storage bank. In addition, once the storage is completed, the controller 230 generates a notification event and transmits the notification event to the power generator 250.

The power generator 250 of the PMIC 210 changes the driving voltage to a newly stored driving voltage predetermined value from the previous driving voltage predetermined value (S1005).

The PMIC 210 measures a turn-on accumulation time of the display device (S1006).

The PMIC 210 compares the measured turn-on accumulation time with an offset predetermined time (S1007). The offset predetermined time may be calculated by detecting the sensing temperature Ta in real time in the PMIC 210 to check the temperature rise saturation or may be a time which is determined during the development and manufacturing process of the display device, and may be obtained based on a point in time at which the sensor temperature Ta is saturated after the turn-on of the display device and the ambient temperature is maintained. The sensor temperature Ta and the panel temperature Tb may have a certain behavior depending on changes in the ambient temperature, after the offset predetermined time.

The PMIC 210 continuously measures the turn-on accumulation time when the turn-on accumulation time does not exceed the offset predetermined time, and detects the sensor temperature Ta when the turn-on accumulation time exceeds the offset predetermined time (S1008).

The PMIC 210 calculates the offset sensor temperature Ta' by adding the offset temperature to the detected sensor temperature Ta. The offset sensor temperature Ta' has a value similar to the panel temperature Tb of a display panel driving area (S1009).

The PMIC 210 refers to the driving voltage predetermined value stored in the T-CON 150 based on the offset sensor temperature Ta' (S1010).

The PMIC 210 stores the received driving voltage predetermined value in the inactive storage bank (S1011).

The PMIC 210 changes the driving voltage to the stored driving voltage predetermined value (S1012). The PMIC 210 then detects the sensor temperature to check whether the driving voltage predetermined value is changed (S1008).

FIG. 9 is a waveform diagram illustrating a driving power of a display device according to an exemplary embodiment of the inventive concept.

Referring to FIG. 9, the PMIC 210 may vary the gate-on voltage VON, the gate-off voltage VOFF, and the analog voltage AVDD among the driving voltages. The ambient temperature may be detected by measuring the temperature sensing voltage VNTC of the temperature sensor 220.

The thin film transistor of the gate driver 130 mounted on the substrate mainly uses an amorphous silicon gate (ASG) and the turn-on characteristic of a gate threshold voltage varies greatly depending on the temperature.

In FIG. 9, Step 1 is a state of low temperature in which the ambient temperature is set to be about −20° C., and the temperature sensing voltage VNTC maintains a relatively low voltage. In the low temperature condition, it is preferable to set a voltage difference between the gate-on voltage VON and the gate-off voltage VOFF of the gate driver 130 to be large to compensate for the characteristics of the thin film transistor on the substrate. Referring to Table 1 below, in Step 1, the gate-on voltage VON is set to be about 38 V and the gate-off voltage VOFF is set to be about −11.6 V. In this example, a power consumed by the display device is about 19 W.

In FIG. 9, Step 2 is a state in which the ambient temperature is set to be about 0° C. The ambient temperature increases from Step 1, and thus the gate-on voltage VON is set to be about 31 V and the gate-off voltage VOFF is set to be about −11.6 V. In Step 2, a power consumed by the display device is about 17 W. As the ambient temperature rises from −20° C. to 0° C., the PMIC 210 receives the driving voltage predetermined value corresponding to Step 2 from the T-CON 150. When the driving voltage is changed to the received driving voltage predetermined value, the PMIC 210 may gradually change the driving voltage for a predetermined time to prevent a sudden change in voltage. Thus, the gate-on voltage VON of FIG. 9 shows a voltage falling continuously from the starting point of Step 2.

In FIG. 9, Step 3 is a state in which the ambient temperature is set to be about 60° C. As the ambient temperature rises, the driving voltage falls to 15V. In the case where the ambient temperature VNTC suddenly rises from Step 2 to Step 3, the PMIC 210 may change the driving voltage rapidly to the driving voltage predetermined value of Step 3, rather than gradually changing the driving voltage. In the high temperature condition, the characteristics of the thin film transistor may change rapidly in accordance with the voltage change. Thus, it is more preferable to accelerate the voltage change in the high temperature state so as to compensate for the change characteristics of the thin film transistor. When the high-temperature state is maintained, it is also possible to apply a lower voltage as the gate-off voltage VOFF, in addition to the change of the gate-on voltage VON, so as to compensate for the high temperature characteristic. Accordingly, referring to FIG. 9 and Table 1, the gate-on voltage VON may be lowered to 15V, and the gate-off voltage VOFF may be lowered to −14.6V. In Step 3, the difference between the gate-on voltage VON and the gate-off voltage VOFF is reduced and the power consumed by the gate driver is about 14 W.

TABLE 1

| | AVDD | VON | VOFF | VIN Current |
|---|---|---|---|---|
| Step 1 (−20° C.) | 14 V (680 mA) | 38 V (110 mA) | −11.6 V (134 mA) | 1.59 A (19 W) |
| Step 2 (0° C.) | 14 V (680 mA) | 31 V (92 mA) | −11.6 V (116 mA) | 1.42 A (17 W) |
| Step 3 (60° C.) | 14 V (680 mA) | 15 V (61 mA) | −14.6 V (86 mA) | 1.21 A (14 W) |

As set forth hereinabove, according to exemplary embodiments of the inventive concept, for a display device including a power device and a gate driver mounted on a substrate, the power device may output an optimum driving voltage in accordance with a change in ambient temperature in the display device.

While the inventive concept has been illustrated and described with reference to the exemplary embodiments thereof, it will be apparent to those of ordinary skill in the art that various changes in form and details may be made thereto without departing from the spirit and scope of the present invention as set forth in the following claims.

What is claimed is:

1. A display device comprising:

a display panel;

a plurality of pixels arranged on the display panel;

a data driver and a gate driver configured to apply a driving signal to the plurality of pixels;

a timing controller configured to apply a control signal to the data driver and the gate driver, and store a plurality of driving voltage predetermined values for different temperatures;

a temperature sensor configured to measure an ambient temperature; and a power management integrated circuit configured to adjust a driving voltage, wherein the power management integrated circuit comprises:

a controller configured to receive a driving voltage predetermined value among the plurality of driving voltage predetermined values from the timing controller using the measured ambient temperature;

a plurality of storage banks configured to store the driving voltage predetermined value; and a power generator configured to output the driving voltage at the driving voltage predetermined value.

2. The display device of claim 1, wherein the temperature sensor comprises a thermistor and is electrically connected to the power management integrated circuit.

3. The display device of claim 1, wherein one of the plurality of storage banks of the power management integrated circuit stores a previous driving voltage predetermined value and another of the plurality of storage banks stores a newly received driving voltage predetermined value from the timing controller.

4. The display device of claim 3, wherein the timing controller includes a plurality of lookup tables configured to store the plurality of driving voltage predetermined values and a plurality of driving voltage change time values, and the power management integrated circuit receives a driving voltage change time value, among the plurality of driving voltage change time values, corresponding to the driving voltage predetermined value from the timing controller and stores the received driving voltage change time value in one of the plurality of the storage banks.

5. The display device of claim 4, wherein the power management integrated circuit changes the driving voltage from a previous driving voltage corresponding to the previous driving voltage predetermined value to a new driving voltage corresponding to the driving voltage predetermined value, according to the driving voltage change time value.

6. The display device of claim 5, wherein the plurality of driving voltage change time values stored in the plurality of lookup tables have different values depending on a temperature.

7. The display device of claim 6, wherein the plurality of driving voltage change time values decrease as temperature increases.

8. The display device of claim 3, wherein the controller receives a first driving voltage predetermined value from the timing controller using an initial temperature measured by the temperature sensor after the display device is turned on and does not change the first driving voltage predetermined value for a predetermined time.

9. A method of managing power of a display device, the method comprising:

outputting a first sensor temperature by detecting an ambient temperature;

referring to a first driving voltage predetermined value stored in a timing controller using the first sensor temperature;

storing the referred first driving voltage predetermined value in a storage bank of a power management integrated circuit;

and changing a driving voltage according to the stored first driving voltage predetermined value in the storage bank.

10. The method of claim 9, further comprising:

calculating a turn-on accumulation time of the display device, wherein the first sensor temperature is an initial sensor temperature immediately after the display device is turned on.

11. The method of claim 10, further comprising comparing the turn-on accumulation time with an offset predetermined time, wherein the offset predetermined time is obtained based on a state of sensor temperature rise saturation.

12. The method of claim 11, wherein when the turn-on accumulation time is less than or equal to the offset predetermined time, the first driving voltage predetermined value is maintained.

13. The method of claim 12, further comprising:

outputting a second sensor temperature by detecting the ambient temperature when the turn-on accumulation time is greater than the offset predetermined time, generating an offset sensor temperature by adding an offset temperature to the second sensor temperature, and referring to a second driving voltage predetermined value stored in the timing controller using the offset sensor temperature.

14. The method of claim 9, wherein the referred first driving voltage predetermined value is stored in an inactive storage bank of the power management integrated circuit, and the method further comprises switching the inactive storage bank to an active storage bank and generating a notification event.

15. The method of claim 14, wherein the driving voltage is changed to the stored first driving voltage predetermined value of the active storage bank according to the notification event.

16. A display device comprising:

a display panel;

a plurality of pixels arranged on the display panel;

a data driver and a gate driver configured to apply a driving signal to the plurality of pixels;

a timing controller configured to provide a first driving voltage predetermined value, among a plurality of driving voltage predetermined values stored therein, and apply a control signal to the data driver and the gate driver;

a temperature sensor configured to measure an ambient temperature; and a power management integrated circuit configured to receive the first driving voltage predetermined value from the timing controller using the measured ambient temperature and adjust a driving voltage using the first driving voltage predetermined value, wherein the timing controller comprises:

a plurality of lookup tables configured to store the plurality of driving voltage predetermined values and a plurality of driving voltage change time values according to different temperatures.

17. The display device of claim 16, wherein the plurality of driving voltage predetermined values includes at least one of analog driving voltages, common voltages, gamma voltages, gate on voltages, or gate off voltages, according to different temperatures.

18. The display device of claim 16, wherein the temperature sensor comprises:

a thermistor connected between a power source and a first node;

a first resistor connected between the power source and the first node; and a second resistor connected between the first node and ground.

19. The display device of claim 16, wherein a first driving voltage change time value, among the plurality of driving voltage change time values, corresponds to the first driving voltage predetermined value, and the power management integrated circuit adjusts the driving voltage over a period of time corresponding to the first driving voltage change time value to target the first driving voltage predetermined value.

20. The display device of claim 16, wherein when the ambient temperature is less than a predetermined threshold, the power management integrated circuit adjusts a gate on voltage and maintains a gate off voltage to target the first driving voltage predetermined value, and when the ambient temperature is greater than or equal to the predetermined threshold, the power management integrated circuit adjusts both the gate on voltage and the gate off voltage to target the first driving voltage predetermined value.

* * * * *